(12) United States Patent
Gupta et al.

(10) Patent No.: US 11,956,124 B1
(45) Date of Patent: Apr. 9, 2024

(54) SYSTEMS AND METHODS FOR IMPLEMENTING POLICY CHANGES IN MULTI-TENANT ENVIRONMENTS

(71) Applicant: Sophos Limited, Abingdon (GB)

(72) Inventors: Prashil Rakeshkumar Gupta, Bangalore (IN); Amit Katyal, Bangalore (IN)

(73) Assignee: Sophos Limited, Abingdon (GB)

( * ) Notice: Subject to any disclaimer, the term of this patent is extended or adjusted under 35 U.S.C. 154(b) by 0 days.

(21) Appl. No.: 18/089,479

(22) Filed: Dec. 27, 2022

(51) Int. Cl.
  *G06F 15/177* (2006.01)
  *H04L 41/085* (2022.01)
  *H04L 41/0894* (2022.01)
  *H04L 67/55* (2022.01)

(52) U.S. Cl.
  CPC ........ *H04L 41/0894* (2022.05); *H04L 41/085* (2013.01); *H04L 67/55* (2022.05)

(58) Field of Classification Search
  CPC .... H04L 41/0894; H04L 41/085; H04L 67/55
  See application file for complete search history.

(56) References Cited

PUBLICATIONS

[Author Unknown] "OPAL Open-Policy Administration Layer" Permit.io [Online] https://web.archive.org/web/20221216170226/https://www.opal.ac/ (Dec. 16, 2022); 3 pages.
[Author Unknown] "permitio/opal" github [Online] https://web.archive.org/web/20221214212116/https://github.com/permitio/opal/ (Dec. 14, 2022); 4 pages.
[Author Unknown] "Real-time dynamic authorization—an introduction to OPAL" Permit.io [Online] https://web.archive.org/web/20220427174116/https://www.permit.io/blog/introduction-to-opal (Apr. 27, 2022); 11 pages.

*Primary Examiner* — Wing F Chan
*Assistant Examiner* — Joseph R Maniwang
(74) *Attorney, Agent, or Firm* — COOLEY LLP (57) ABSTRACT

In one or more embodiments, an apparatus includes one or more memories and one or more processors operatively coupled to the one or more memories. The one or more processors is configured to receive a policy bundle associated with at least one tenant from a plurality of tenants, determine a policy change associated with a change between the policy bundle and a tenant policy, the policy change associated with a load value, subscribe an administration client to an administration layer server based on the tenant policy, transmit the policy change to the administration layer client, implement the policy change into an agent associated with the administration layer client, determine a system load status based on a plurality of administration layer clients and the load value, and responsive to determining the system load status exceeds a predetermined threshold, generate at least one agent associated with the at least one tenant.

20 Claims, 7 Drawing Sheets

SYSTEMS AND METHODS FOR IMPLEMENTING POLICY CHANGES IN MULTI-TENANT ENVIRONMENTS

BACKGROUND

In one or more implementations, processing policy bundles can be used to determine policy changes and system load for a multi-tenant environment.

Policy bundles in multi-tenant environments may be applied and/or executed for all or a subset of the tenants at various times. Some known multi-tenant environments include a single administrative layer agent that may cause a bottleneck when the number of tenants increases above a bottleneck threshold. The bottleneck may prevent the multi-tenant environment from implementing policy changes in a desired amount of time and/or may prevent the multi-tenant environment from scaling. A scalable multi-tenant environment may be desired to allow implementation of policy changes to a group of tenants.

In some known multi-tenant environments, the administrative layer agent checks for changes in policy by repeatedly polling a control plane service, which uses computing resources of the multi-tenant environments. The computing resources used in polling operations scale with the number of tenants. Additionally, in some known multi-tenant environments, the entire policy bundle is sent to the administrative layer agent and the administrative layer agent determines the change between the present policy and the policy bundle. This may be an unnecessary amount of strain on the resources used to execute and/or manage the administrative layer agent. Accordingly, a multi-tenant environment that decreases load on the administrative layer agent is desired.

SUMMARY

In some embodiments, an apparatus includes one or more memories and one or more processors operatively coupled to the one or more memories. The one or more processors are configured to receive a policy bundle associated with at least one tenant from a plurality of tenants and determine a policy change associated with a change between the policy bundle and a tenant policy of the at least one tenant. The policy change is associated with a load value. The one or more processors are configured to subscribe an administration client to an associated channel of an administration layer server based on the tenant policy, transmit the policy change to the administration layer client, implement the policy change into an agent associated with the administration layer client, determine a system load status based on a plurality of administration layer clients and the load value, and responsive to determining that the system load status exceeds a predetermine threshold, generate at least one agent associated with the at least one tenant.

In some embodiments, a non-transitory processor-readable medium stores code representing instructions to be executed by one or more processors. The instructions include code to cause the one or more processors to receive at least one policy bundle associated with at least one tenant from a plurality of tenants and determine a policy change associated with a change between the at least one policy bundle and a tenant policy of the at least one tenant. The policy change is associated with a load value. The instructions further include code to cause the one or more processors to transmit, based on an administration client being subscribed to an associated channel of an administration layer server, the policy change to the administration layer client, implement the policy change into an agent associated with the administration layer client, determine a system load status based on a plurality of administration layer clients and the load value, and responsive to determining that the system load status exceeds a predetermine threshold, generate at least one agent associated with the at least one tenant.

In some embodiments, a method includes receiving, by one or more processors, at least one policy bundle associated with at least one tenant from a plurality of tenants and determining, by the one or more processors, a policy change associated with a change between the policy bundle and a tenant policy of the at least one tenant. The policy change is associated with a load value. The method further including sending, by the one or more processors, the policy change to an administration layer server. The administration layer server is configured to communicate with an administration layer client associated with the policy change. The method further including sending, by the one or more processors, a configuration signal to an authorization client configured to receive an authorization request associated with the policy change, determining, by the one or more processors, a system load status based on a plurality of administration layer clients and the load value, and responsive to determining that the system load status exceeds a predetermined threshold, sending, by the one or more processors to the administration layer server, a signal to the administration layer server. The signal includes instructions to generate at least one agent associated with the at least one tenant.

DETAILED DESCRIPTION

In some implementations, a user (e.g., administrator, software end-user, manager, etc.) provides a policy bundle (e.g., set of policy parameters, policy codes, policy configuration, policy information, etc.) associated with at least a subset of tenants from a plurality of tenants in a multi-tenant environment. A policy change can be determined between the policy bundle and a tenant policy of a tenant from the subset of tenants. In some implementations, the policy change can be associated with a load value. An administration client may be subscribed to an associated channel of an administration layer based on the tenant policy. The policy change may then be implemented into an agent associated with the administration layer client. A system load status may then be determined based on the administration layer clients and the load value. Thereafter, a new agent associated with the subset of tenants may be generated if the system load status exceeds a predetermined threshold.

Some techniques described herein allow for a multi-tenant environment to distribute policy changes across multiple administrative layer agents instead of through a single agent, which can create a bottleneck. To handle an increasing number of tenants in the multi-tenant environment, additional administrative layer agents may be created and/or defined to handle additional load from the added tenants. This allows for the multi-tenant environment to scale automatically regardless of the number of tenants. Some techniques described herein allow for the multi-tenant environment to decrease the resource usage of the administrative layer agent by notifying the administrative layer agent of a policy change instead of repeatedly polling a control plane service, thus freeing computational resources. The multi-tenant environment additionally decreases the resource usage by pushing and/or sending the policy change to the administrative layer agent instead of pushing and/or sending the entire policy bundle to the administrative layer agent.

Figure 1:
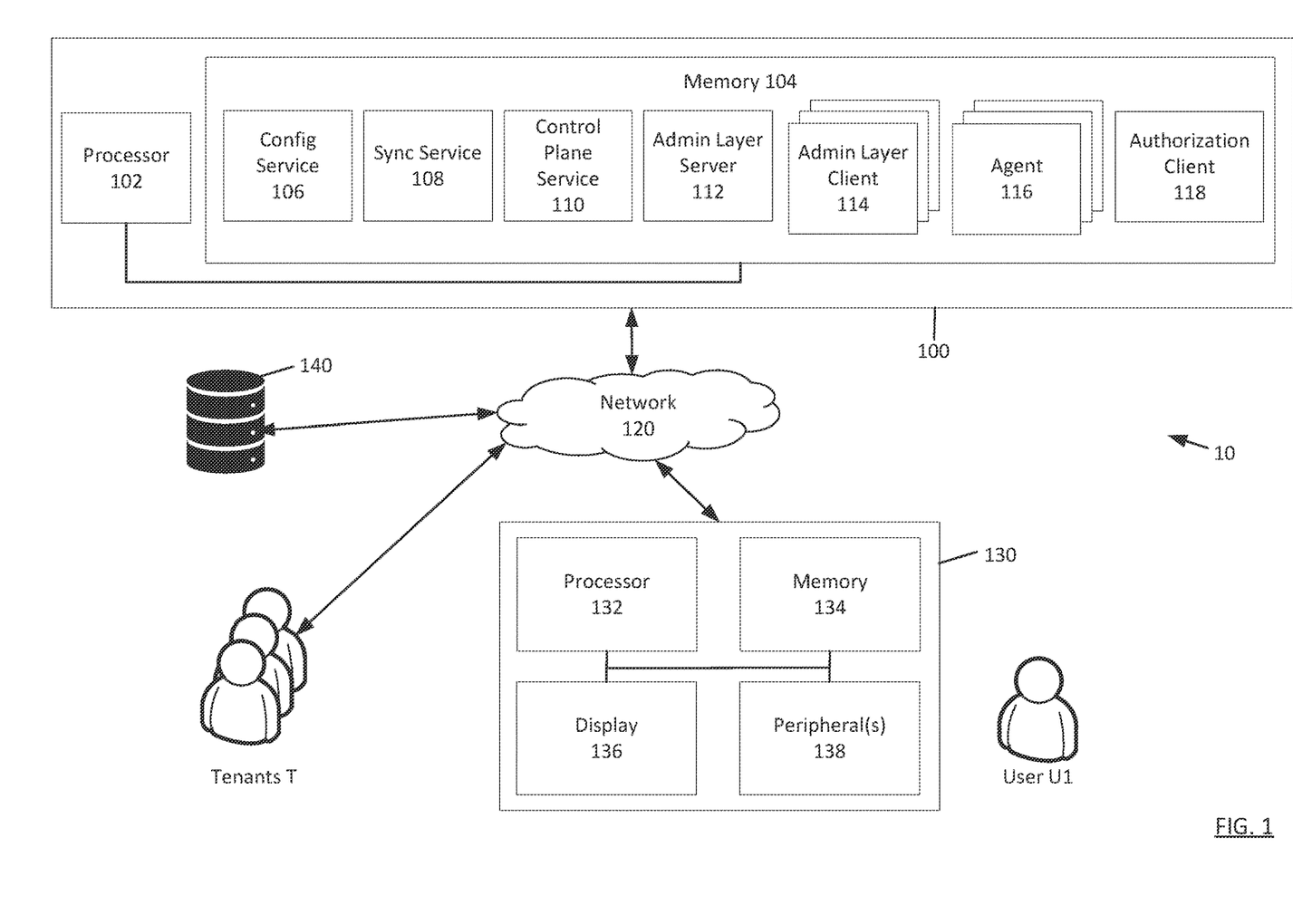
FIG. 1 shows a block diagram of a system for implementing policy bundles in a multi-tenant environment with a group of tenants, according to an embodiment.

FIG. 1 shows a block diagram of a system 10 for implementing policy bundles in a multi-tenant environment with a group of tenants T. Each of the tenants T includes at least one user. In some implementations, the users of the tenants T interact with the components of the system 10 via user devices (e.g., mobile devices, cloud systems, computers, etc.). The system 10 can include a policy processing system 100, a user compute device 130, and a database 140, each operatively coupled to one another via a network 120.

The network 120 may be used to facilitate communication between the components of the system 10. For example, the network 120 may facilitate operation between policy processing system 100, the user compute device 130, the database 140, and/or tenants T. The network 120 can be any suitable communications network for transferring data, operating over public and/or private networks. For example, the network 120 can include a private network, a Virtual Private Network (VPN), a Multiprotocol Label Switching (MPLS) circuit, the Internet, an intranet, a local area network (LAN), a wide area network (WAN), a metropolitan area network (MAN), a worldwide interoperability for microwave access network (WiMAX®), an optical fiber (or fiber optic)-based network, a Bluetooth® network, a virtual network, and/or any combination thereof. In some instances, the network 120 can be a wireless network such as, for example, a Wi-Fi or wireless local area network ("WLAN"), a wireless wide area network ("WWAN"), and/or a cellular network. In other instances, the network 120 can be a wired network such as, for example, an Ethernet network, a digital subscription line ("DSL") network, a broadband network, and/or a fiber-optic network. In some instances, the network can use Application Programming Interfaces (APIs) and/or data interchange formats (e.g., Representational State Transfer (REST), JavaScript Object Notation (JSON), Extensible Markup Language (XML), Simple Object Access Protocol (SOAP), and/or Java Message Service (JMS)). The communications sent via the network 120 can be encrypted or unencrypted. In some instances, the communication network 120 can include multiple networks or subnetworks operatively coupled to one another by, for example, network bridges, routers, switches, gateways and/or the like (not shown).

The user compute device 130 can be a device configured to control and/or provide signals to the policy processing system 100. For example, the user computer device 130 may be used to provide policy information to the policy processing system 100. In some implementations, the user compute device 130 may be configured to monitor the operation of the policy processing device 100. For example, the user compute device 130 may display progress and/or results of a policy implementation. The user compute device 130 can include a processor 132, memory 134, display 136, and peripheral(s) 138, each operatively coupled to one another (e.g., via a system bus). In some implementations, the user compute device 130 is associated with (e.g., owned by, accessible by, operated by, etc.) a user U1. The user U1 can be any type of user, such as, for example, an administrator, a manager, and/or the like.

The processor 132 of the user compute device 130 can be, for example, a hardware based integrated circuit (IC), or any other suitable processing device configured to run and/or execute a set of instructions or code. For example, the processor 132 can be a general-purpose processor, a central processing unit (CPU), an accelerated processing unit (APU), an application specific integrated circuit (ASIC), a field programmable gate array (FPGA), a programmable logic array (PLA), a complex programmable logic device (CPLD), a programmable logic controller (PLC) and/or the like. The processor 132 can be operatively coupled to the memory 134 through a system bus (for example, address bus, data bus and/or control bus).

The memory 134 of the user compute device 130 can be, for example, a random-access memory (RAM), a memory buffer, a hard drive, a read-only memory (ROM), an erasable programmable read-only memory (EPROM), and/or the like. In some instances, the memory 134 can store, for example, one or more software programs and/or code that can include instructions to cause the processor 132 to perform one or more processes, functions, and/or the like. In some implementations, the memory 134 can include extendable storage units that can be added and used incrementally. In some implementations, the memory 134 can be a portable memory (e.g., a flash drive, a portable hard disk, and/or the like) that can be operatively coupled to the processor 132. In some instances, the memory 134 can be remotely operatively coupled with a compute device (not shown). For example, a remote database device can serve as a memory and be operatively coupled to the compute device.

The peripheral(s) 138 can include any type of peripheral, such as an input device, an output device, a mouse, keyboard, microphone, touch screen, speaker, scanner, headset, printer, camera, and/or the like. In some instances, the user U1 can use the peripheral(s) 138 to input a command to implement a policy bundle. For example, the user U1 may type the command using a keyboard included in peripheral (s) 138 to indicate the command and/or select the command using a mouse included in peripherals(s) 138 to indicate the command.

Figure 7:
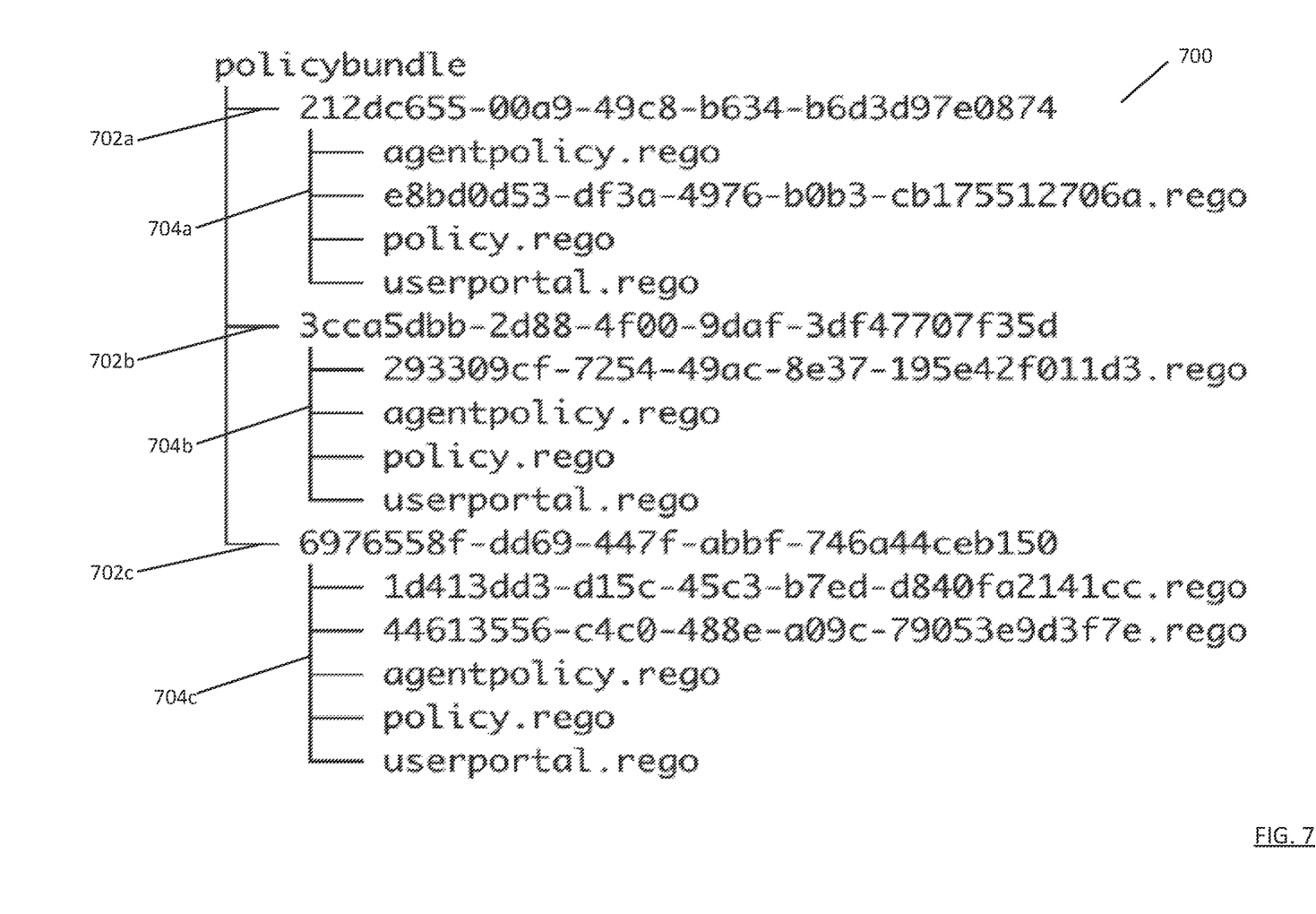
FIG. 7 shows an example of a policy bundle, according to an embodiment.

The display 136 can be any type of display, such as, for example, a Cathode Ray tube (CRT) display, a Liquid Crystal Display (LCD), a Liquid Emitting Diode (LED) display, an Organic Light Emitting Diode (OLED) display, and/or the like. The display 136 can be used for visually displaying information (e.g., command line, etc.) to user U1. For example, display 136 can display process or the results of a policy bundle implementation. An example of an output that can be displayed by the display 136 is shown at FIG. 7.

The database 140 may be used to store information regarding policies of the tenants T and/or information regarding the implementation of a policy bundle. For example, the database 140 may store the present policies of the tenants T, a repository of possible policies and policy changes, policy change history, the policy bundle, and/or the like. The database 140 can be any device or service (e.g., hard-drive, server, cloud storage service, etc.) configured to store signals, information, commands, natural language (NL) descriptions, and/or data. The database 140 may receive and store signals, information and/or data from the other components of the system 10. The database 140 may include a local storage system associated with the policy processing system 100, such as a server, a hard-drive, and/or the like or a cloud-based storage system. In some implementations, the database 140 may include a combination of local storage systems and cloud-based storage systems.

The policy processing system 100 is configured to receive a policy bundle and implement the policy bundle into a policy of an associated tenant from the tenants T. The policy processing system 100 can include a processor 102 and a memory 104, each operatively coupled to one another (e.g., via a system bus). The memory 104 can include a configuration service 106, a synchronization service 108, a control plane service 110, an administrative layer server 112, administrative layer clients 114, agents 116, and an authorization client 118. In some implementations, the user compute device 130 is associated with (e.g., owned by, accessible by, operated by, etc.) an organization, and the policy processing system 100 is associated with (e.g., owned by, accessible by, operated by, etc.) the same organization. In some implementations, the user compute device 130 is associated with (e.g., owned by, accessible by, operated by, etc.) a first organization, and the policy processing system 100 is associated with (e.g., owned by, accessible by, operated by, etc.) a second organization different than the first organization. In some implementations, the policy processing system 100 and the user compute device 130 may be components of the same computing system.

The processor 102 of the policy processing system 100 can be, for example, a hardware based integrated circuit (IC), or any other suitable processing device configured to run and/or execute a set of instructions or code. For example, the processor 102 can be a general-purpose processor, a central processing unit (CPU), an accelerated processing unit (APU), an application specific integrated circuit (ASIC), a field programmable gate array (FPGA), a programmable logic array (PLA), a complex programmable logic device (CPLD), a programmable logic controller (PLC) and/or the like. The processor can be operatively coupled to the memory 104 through a system bus (e.g., address bus, data bus, and/or control bus).

The memory 104 of the of the policy processing system 100 can be, for example, a random-access memory (RAM), a memory buffer, a hard drive, a read-only memory (ROM), an erasable programmable read-only memory (EPROM), and/or the like. In some instances, the memory 104 can store, for example, one or more software programs and/or code that can include instructions to cause the processor 102 to perform one or more processes, functions, and/or the like. In some implementations, the memory 104 can include extendable storage units that can be added and used incrementally. In some implementations, the memory 104 can be a portable memory (e.g., a flash drive, a portable hard disk, and/or the like) that can be operatively coupled to the processor 102. In some instances, the memory 104 can be remotely operatively coupled with a compute device (not shown). For example, a remote database device can serve as a memory and be operatively coupled to the compute device.

The policy processing system 100 can receive a policy bundle from the user U1. For example, the user U1 can input the policy bundle into the user computer device 130, which can then send the policy bundle to the policy processing system 100 via the network 120. The policy bundle may include a configuration for a subset of tenant policies associated with a subset of tenants. The policy bundle may include a whole policy or may include a subset of a policy that was changed and/or updated.

The configuration service 106 is configured to receive the policy bundle from user compute device 130 directly or via the network 120. In some implementations, the configuration service 106 may configure the policy bundle to be in a machine-readable format. For example, the configuration service may receive the policy bundle as a series of user inputs (e.g., inputs into a graphical user interface) and may configure the policy bundle into a format that is able to be executed by the policy processing system 100. The policy bundle is received by the configuration service 106 and pushed and/or sent to the synchronization service 108 (also referred to herein as the sync service).

The sync service 108 is configured to synchronize information within the policy processing system 100. In some implementations, the sync service 108 is configured to send policy bundles and/or tenant T information as well as receive information regarding the policy bundle implementation process. In some implementations, the sync service 108 can send the policy bundle to the database 140 to be stored.

The control plane service 110 is configured to manage the implementation of the policy bundle and/or manage the load on the policy processing system 100. In some implementations, the control plane service 110 may be configured to create and/or define new components within the memory 104 to manage the load on the policy processing system 100. The control plane service 110 receives the policy bundle from either the synchronization service 108 and/or the database 140, for example, via a publisher/subscriber channel. The control plane service 110 can compare the policy bundle to the present policy of the associated subset of tenants. In some implementations, the control plane service 110 receives the present policy from the database 140. Based on the comparison, the control plane service 110 can determine a policy change. The policy change can be the same for all of the tenants in the subset of tenants or may include a separate policy change for each tenant of the subset of tenants. In some implementations, the control plane service 110 may determine with which tenants T the policy bundle is associated.

The administrative layer server 112 may be a component of an administrative layer (e.g., the administrative layer server 112, the administrative layer clients 114, and the agents 116). In some implementations, the administrative layer server 112 can be an Open Policy Administrative Layer (OPAL) server, etc. The administrative layer server 112 may be used to distribute policy changes to the destination, as indicated in the policy bundle. After determining the policy change, the control plane service 110 can send the policy change to the administrative layer server 112. In some implementations, the administrative layer server 112 is a virtual server. In some implementations, the administrative layer server 112 is a device external of the policy processing system 100. In some implementations, the administrative layer server 112 has a publisher/subscriber channel relationship with the administrative layer clients 114. In some implementations, the publisher/subscriber channel is a configurable backbone publish/subscribe channel which allows for creation of back-end channels. The publish/subscribe channel can be a procedure and/or design patten in which subscribers interested in changes in policy can subscribe to policy change notifications and publishers monitor for a policy change and notify the subscriber if a policy change is identified.

The administrative layer clients 114 are configured to receive the policy change and are configured to apply the policy change. In some implementations, the administrative layer server 112 may be an OPAL client, etc. The administrative layer server 112 sends the policy change to the administrative layer clients 114 associated with the policy change via the publisher/subscriber channel. Each administrative layer client 114 can then send the policy change to an associated agent 116 to be implemented into the associated tenant's policy. In some implementations, each administrative layer client 114 is associated with one agent 116. In some implementations, each administrative layer client 114 can be associated with multiple agents 116. In some implementations, the administrative layer clients 114 and the agents 116 are virtual devices within the memory 104. In some implementations, the administrative layer clients 114 and the agents 116 can be physical devices.

The agents 116 are configured to store and manage policies of the tenants T. For example, the agents 116 may include various policy-related services such as policy compilation, policy security, policy queries, etc. In some implementations, the administrative layer server 112 may be an Open Policy Administrative agents, etc. In some implementations, each pair of administrative layer clients 114 and agents 116 is associated with a single tenant of the tenants T. In some implementations, a pair of one of the administrative layer clients 114 and one of the agents 116 can be associated with more than one tenant of the tenants T.

The authorization client 118 is configured to manage policy bundle implementation authorization. Implementation authorization provides additional security so that the policy bundle implementation aligns with the desired policies of the tenants T. The control plane service 110 additionally can send an authorization configuration to the authorization client 118. The authorization configuration is associated with the policy change and/or the policy bundle as well as the associated tenant of the tenants T. The authorization client 118 can send an authorization request to the associated tenant. The associated tenant may then review the policy change and/or the policy bundle and return an authorization message to the authorization client 118. The authorization client 118 can send the authorization message to the administrative layer client 114 and the agent 116 associated with the policy change. If the authorization message indicates an approval, the agent 116 can implement the policy change. If the authorization message indicates a rejection, the agent 116 will not implement the policy change.

The control plane service 110 can additionally determine the load on the agents 116. The control plane service 110 may monitor resource use by the agents 116. For example, the control plane service 110 may identify and/or monitor the resources used by current processes as well as the resources used to implement the present policy change. The control plane service 110 may determine if the resources used by the present policy change and the current processes exceed a predetermined threshold. The predetermined threshold may correspond to a maximum resource utilization load allowed for policy implementation processes (e.g., 5%, 10%, 20%, 30%, 40%, 50%, 60%, 70%, 80%, 90%, 100% of the total load). If the control plane service 110 determines that the resources used by the present policy change as well as the resources used by the current processes exceed the predetermined threshold, the control plane service 110 may create and/or define additional administrative layer clients 114 and associated agents 116. In some implementations, the new administrative layer clients 114 and agents 116 may be formed and implement the policy change. For example, if the processors and/or memories associated with existing administrative layer clients 114 and associated agents 16 have exceeded the predetermined threshold, new administrative layer clients 114 and new agents 116 can be formed to process the present policy change. The newly formed administrative layer clients 114 and agents 116 can include publisher/subscriber channels with the administrative layer server 112 to allow for the policy changes to reach desired administrative layer client(s) 114 and the desired agent(s) 116.

Although FIG. 1 is described in reference to one policy bundle, multiple policy bundles may be processed substantially simultaneously in parallel and/or by one or more devices. For example, a first policy bundle may be associated with a first tenant and a second policy bundle may be associated with a second tenant. The control plane service 110 may calculate system load for multiple policy bundles at a time and may create and/or define multiple administrative layer clients 114 and agents 116 as needed.

Figure 2:
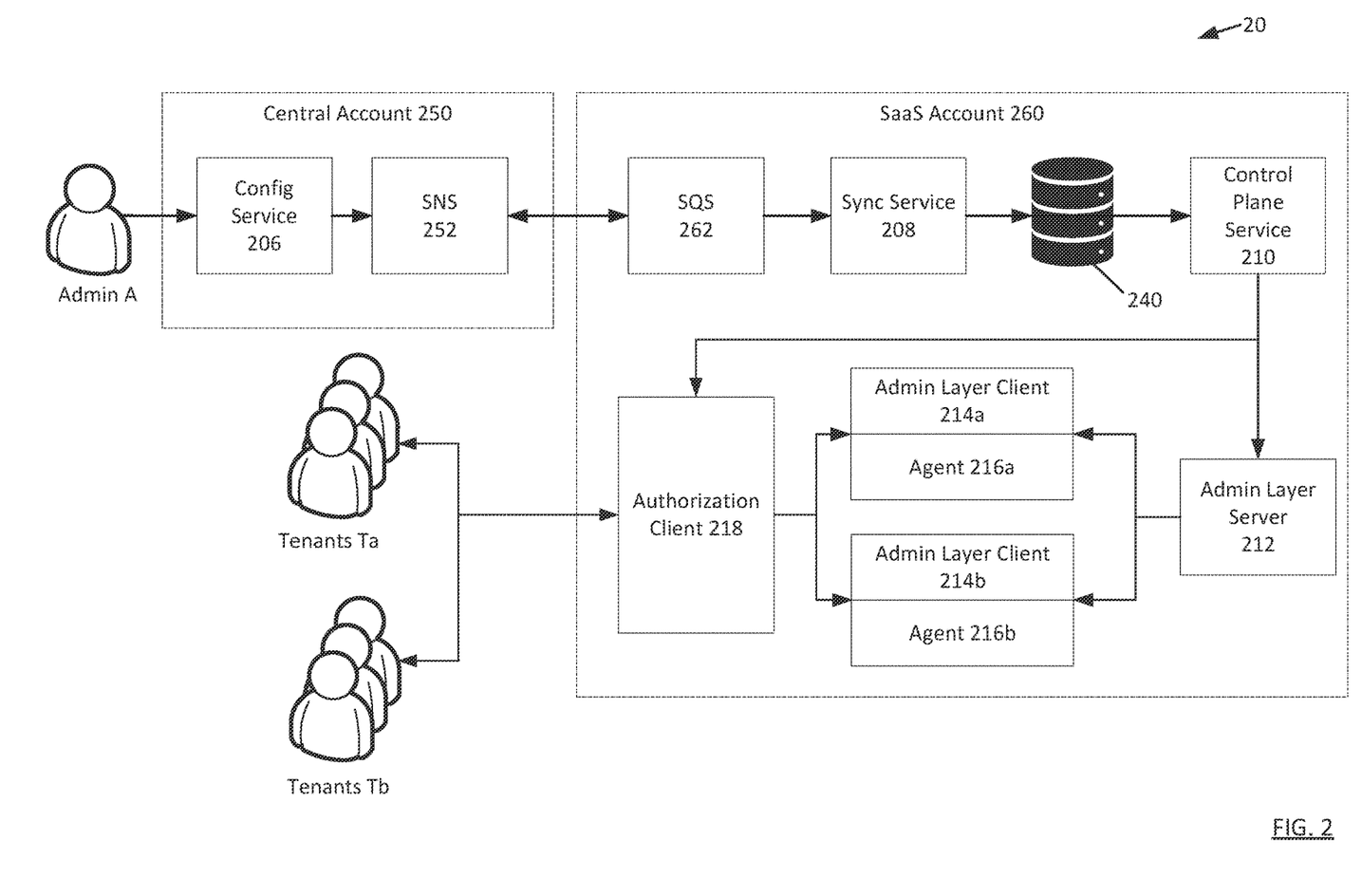
FIG. 2 shows a block diagram of a processing environment for implementing policy bundles in a multi-tenant environment, according to an embodiment.

FIG. 2 shows a block diagram of a processing environment 20 for implementing policy bundles in a multi-tenant environment, according to an embodiment. The processing environment 20 includes a central account 250 and a software-as-a-service account 260 (also known as a SaaS account), which interact with an administrator A (also known as an admin) and tenants (Ta and Tb). In some implementations, the tenants (Ta and Tb) and/or the administrator A interact with the central account 250 and/or the SaaS account 260 via an edge application of a device (e.g., personal device, mobile device, personal computer, etc.) associated with the tenants (Ta and Tb). The edge application serves as an access barrier to the resources of the processing environment 20 so that only users with appropriate credentials may access and/or alter the information within the processing environment 20. In some implementations, the administrator A may be any policy source (e.g., policy database, policy roll-out system, automatic policy update system, etc.) configured to send a policy update. The processing environment 20 may be a component of a larger computing environment of a client (e.g., local computing system, cloud computing system, cloud computing product, etc.). The processing environment 20 may include at least a portion of the policy processing system 10 of FIG. 1.

The central account 250 includes a configuration service 206 and a simple notification service (SNS) 252. In some implementations, the central account 250 and its components may be stored in a memory (e.g., functionally and/or substantially similar to the memory 134 of FIG. 1). In some implementations, the processes described in reference to the central account 250 and its components can be executed on a processor (e.g., functionally and/or substantially similar to the processor 132 of FIG. 1). The central account 250 may be a central account of a client's computing environment. The central account 250 may be configured to manage and/or execute tasks other than policy processing and implementation. The configuration service 206 (e.g., structurally and/or functionally similar to the configuration service 106 of FIG. 1) that may receive a policy bundle from the admin A. The admin A may be a user with permission to enter changes to tenant policy. In the processing environment 20, the policy bundle may be associated with the tenants Ta and/or the tenants Tb. For example, the policy bundle may be associated with the tenants Ta, the tenants Tb, or both the tenants Ta and the tenants Tb.

The configuration service 206 sends the policy bundle and/or a signal indicating a policy bundle has been received to the simple notification service 252 (also known as an SNS). The SNS 252 is configured to form a publish/subscribe channel. The SNS may form a publish/subscribe channel between the central account 250 and the SaaS account 260. The publish/subscribe channel may already be present or may be formed as a result of the central account 250 receiving the policy bundle.

The SaaS account 260 is an account of a specialized software package. For example, the SaaS account may be a policy management software. In some implementations, the central account 250 and the SaaS account 260 may be the same account. In some implementations, the SaaS account 260 and its components may be stored in a memory (e.g., functionally and/or substantially similar to the memory 104 of FIG. 1). In some implementations, the processes described in reference to the SaaS account 260 and its components can be executed on a processor (e.g., functionally and/or substantially similar to the processor 102 of FIG. 1). The central account 250 may be a central account of a client's computing environment. The SaaS account includes a simple queue service 208, a sync service 208, a database 240, a control plane service 210, an admin layer server 212, administrative layer clients (214a and 214b), agents (216a and 216b), and an authorization client 218.

The simple queue service 262 (also known as an SQS) is configured to receive the policy bundle and/or a signal from the SNS 252. The SNS 252 and the SQS 262 may communicate via a web-hook/polling system, which includes the SNS 252 notifying the SQS 262 of a policy bundle. The SNS 252 and the SQS 262 can, for example, be a queue service/notification service. The SQS 262 may notify the administrative layer (e.g., administrative layer server 212, administrative layer client (214a and 214b)) of the policy bundle via an exposed rest application programmable interface. In response to receiving a notification, the administrative layer may fetch the new policy bundle.

The SQS 262 adds the policy bundle to a queue and then pushes the policy bundle to a sync service 208 (e.g., structurally and/or functionally similar to the sync service 108 of FIG. 1). In some implementations, the SQS 262 allows for the SNS 252 to continuously, periodically and/or sporadically push policy bundles to the SaaS account 260 without initially overloading the SaaS account 260. The sync service 208 receives the policy bundle from the SQS 262 and stores the policy bundle in the database 240 (e.g., structurally and/or functionally similar to the database 140 of FIG. 1). The database 240 stores the policy bundle as well as any other information associated with the policy bundle such as time of entry, credentials of Admin A, type of policy, etc.

The control plane service 210 (e.g., functionally and/or structurally similar to the control plane service 110 of FIG. 1) receives the policy bundle from the sync service 208 and/or the database 240. The control plane service 210 may also receive a current policy associated with the policy bundle from the database 240. For example, if the policy bundle is associated with a first tenant, then the control plane service 210 may receive the current policy of the first tenant. The control plane service 210 compares the current policy to the policy bundle to determine a policy change associated with the difference between the current policy and the policy bundle. In some implementations, the control plane service 210 also configures the edge application such that the end user request (e.g., input from the administrator A and/or the tenants (Ta and Tb)) is forwarded to the correct destination. The edge application may be a reverse proxy server that ensures only end users (e.g., the admin A) with valid permissions may make changes. For example, the edge application may direct a policy bundle associated with a first tenant and a second tenant to the respective tenants for validation.

The administrative layer server 212 (e.g., functionally and/or structurally similar to the administrative layer server 112 of FIG. 1) receives the policy change from the control plane service 210. In some implementations, the administrative layer server 212 receives the policy bundle and the current policy and determines the policy change. The administrative layer server 212 directs the policy changes to associated administrative layer clients (214a and 214b) (e.g., functionally and/or structurally similar to the administrative layer clients 114 of FIG. 1). For example, if the policy bundle is associated with a first group of tenants (e.g., the tenants Ta), the administrative layer server 212 may direct the policy change to the administrative layer client (214a and 214b) associated with the first group of tenants' policy. In some implementations, the administrative layer server 212 may send the policy change to multiple administrative clients (214a and 214b).

Prior to implementation, an authorization process may occur. In some implementations, the authorization process may be facilitated by the edge application. The administrative layer clients (214a and 214b) associated with the policy bundle may be subscribed to the publisher/subscriber channel with the authorization client 218 (e.g., functionally and/or structurally similar to the authorization client 118 of FIG. 1) and/or with the tenants (Ta and Tb) associated with the policy change. For example, a policy change may be associated with the administrative layer client 214b and the tenants Ta. The administrative layer client 214b may be subscribed to a publisher/subscriber channel with the tenants Ta directly or via the authorization client 218. The authorization client 218 receives information regarding the policy bundle from the control plane service 210. The authorization client 218 sends an authorization request associated with the policy bundle to an associated group of tenants (e.g., tenants Ta and/or tenants Tb). The authorization request may include information regarding the policy change and other information that may be relevant for authorization such as the policy being changed, admin A information, a change log, etc. The authorization request prompts the tenants (Ta and/or Tb) to return either an allow message or a deny message (collectively known as an allow/deny message). In some implementations, the authorization request may prompt all tenants of the group of tenants to respond. In some implementations, one tenant response may act as an allow/deny message. In some implementations, the authorization client 218 may receive a number of allow/deny messages from the tenants and may determine if a majority of messages are allow messages or deny messages. Once the authorization client 218 receives and/or determines an allow/deny message, the authorization client sends a respective signal indicating an allow or a deny to the administrative layer client associated with the policy bundle.

The administrative layer clients (214a and 214b) are operatively coupled to respective agents (216a and 216b) (e.g., functionally and/or structurally similar to the agent 116 of FIG. 1). The agents (216a and 216b) receive the policy change from the administrative layer client (214a and 214b) responsive to the administrative layer client (214a and 214b) receiving an allow message from the authorization client. The agents (216a and 216b) implement the policy change into the policy of the associated tenant (Ta and/or Tb). In some implementations, the agents (216a and 216b) and/or the administrative layer clients (214a and 214b) may send progress information of the policy bundle implementation process to the tenants (Ta and Tb), the admin A, and/or the control plane service 210. For example, the progress information may include an implementation confirmation sent to the tenants (Ta and/or Tb). As another example, the implementation progress may include a high load notification indicating that at least one of the administrative layer clients (214a and 214b) is near, at, or above processing capacity.

The control plane service 210 may generate additional administrative layer clients and/or agents based on the load on the present administrative layer clients (214a and 214b). For example, if the load on the present administrative layer clients (214a and 214b) is at or above a predetermined threshold, the control plane service 210 generates an additional administrative layer client to alleviate the load and provide a new processing path. In some implementations, the control plane service 210 may generate publisher/subscriber channels associated with the additional layer client. The publisher/subscriber channels are formed between the additional administrative layer client and the administrative layer server 212 and/or the tenants (Ta and Tb) and/or the authorization client 218.

Figure 3:
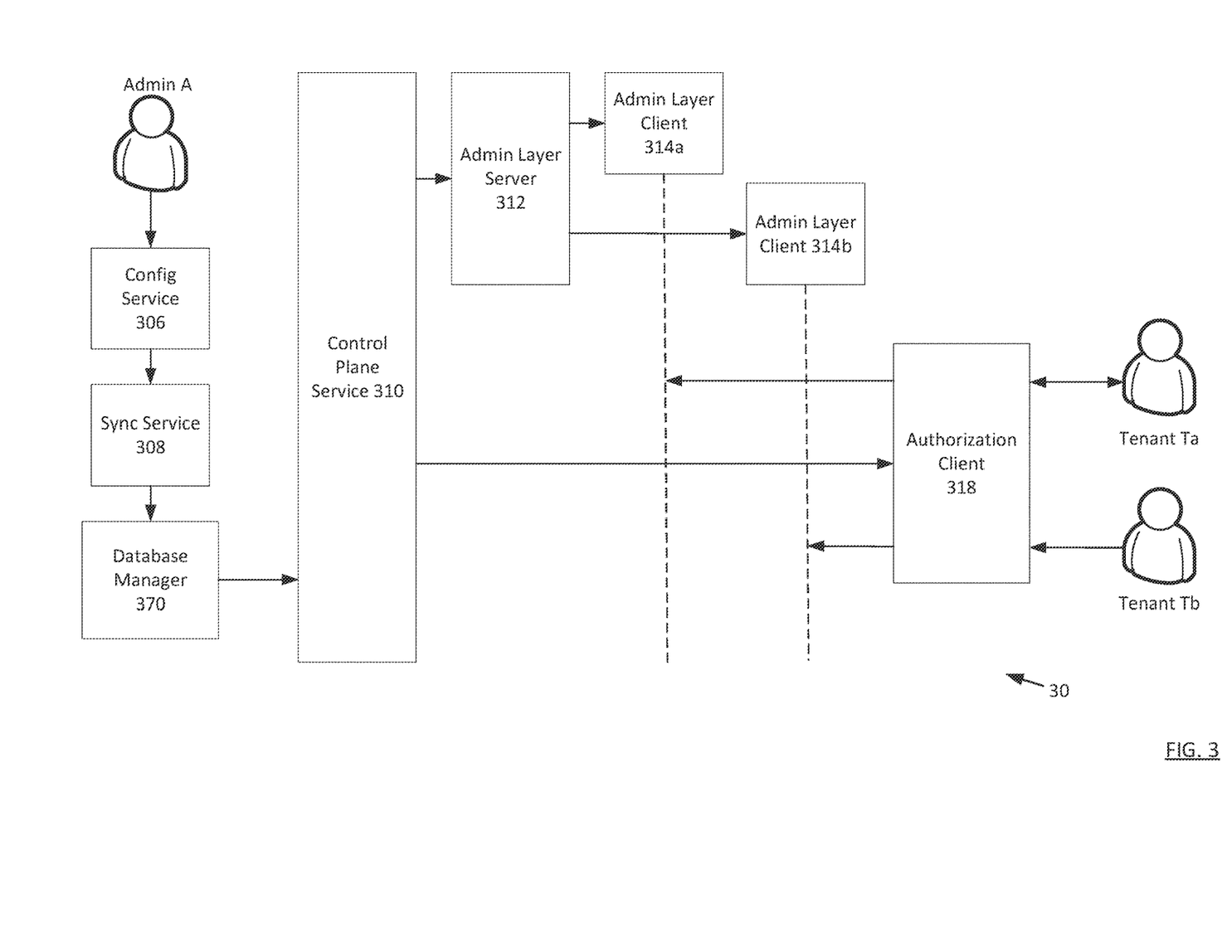
FIG. 3 shows a workflow for implementing policy bundles in a multi-tenant environment, according to an embodiment.

FIG. 3 shows a workflow 30 for implementing a policy bundle in a multi-tenant environment, according to an embodiment. The workflow 30 relates to an admin A policy bundle that is associated with the policies of two tenants (Ta and Tb). The workflow 30 may be executed with a policy processing system 10 and/or in the processing environment 20. The workflow 30 includes a configuration service 306 (e.g., functionally and/or structurally similar to the configuration service 106 of FIG. 1 and/or the configuration service 206 of FIG. 2), a synchronization service 308 (e.g., functionally and/or structurally similar to the synchronization service 108 of FIG. 1 and/or the synchronization service 206 of FIG. 2), a database manager 370, a control plane service 310 (e.g., functionally and/or structurally similar to the control plane service 106 of FIG. 1 and/or the control plane service 206 of FIG. 2), an administrative layer server 312 (e.g., functionally and/or structurally similar to the administrative layer server 126 of FIG. 1 and/or the administrative layer server 212 of FIG. 2), administrative layer clients (314a and 314b) (e.g., functionally and/or structurally similar to the administrative layer clients 114 of FIG. 1 and/or the administrative layer clients 214 of FIG. 2), and an authorization client 318 (e.g., functionally and/or structurally similar to the authorization client 118 of FIG. 1 and/or the authorization client 218 of FIG. 2).

The workflow 30 includes the admin A inputting the policy bundle into the configuration service 306. The configuration service 306 receives the policy bundle and configures the policy bundle for processing. The configuration service 306 sends a notification to the synchronization service 308 indicating that a new policy bundle is received. The policy bundle is then sent to the database manager 370 for storage.

The database manager 370 receives the policy bundle and stores the policy bundle in a database (e.g., functionally and/or structurally similar to the database 140 of FIG. 1 and/or the database 240 of FIG. 2). The database manager 370 may determine a specific storage location associated with the policy bundle. For example, the database manger 370 may store the policy bundle in a library location related to an associated tenant. As another example, the database manager 370 may include additional information regarding the policy bundle such as admin A information, time of entry, size of policy bundle, etc. In some implementations, the database manger 370 may include the policy bundle and/or a reference to the policy bundle in multiple locations in the database. In some implementations, the database manager 370 may be a commercial database manager such as Redis.

After the policy bundle is stored by the database manager 370, the control plane service 310 receives the policy bundle. In some implementations, the database manager 370 sends additional information associated with the policy bundle to the control plane service 310. For example, the additional information may include the current policies of the tenants (Ta and Tb). The control plane service 310 compares the policy bundle to the current policies to generate a policy change. In some implementations, the control plane service 310 may generate a first policy change associated with the policy of a first tenant (e.g., the tenant Ta) and a second policy change associated with the policy of a second tenant (e.g., the tenant Tb). The control plane service 310 may determine publisher/subscriber channels associated with the policy bundle for implementing the policy changes. The control plane service 310 additionally sends an authorization request notification to the authorization client 318. The authorization request notification may include information regarding the policy change as well as with which tenants from the tenants (Ta and Tb) the policy change or each portion of the policy change is associated. For example, the authorization request notification may include information regarding a first policy change corresponding to the tenant Ta and a second policy change corresponding to the tenant Tb.

The control plane service 310 sends the policy change and/or the relevant publisher/subscriber channel information to the administrative layer server 312. In some implementations, certain processes of the control plane service 310, such as generating the policy change, may be executed by the administrative layer server 312. The administrative layer server 312 distributes the policy changes to associated administrative layer clients (314a and 314b) based on the publisher/subscriber channels associated with the policy change. In FIG. 3, the tenant Ta is associated with the administrative layer client 314a and the tenant Tb is associated with the administrative layer client 314b. The administrative layer server 312 directs a first policy change associated with the tenant Ta to the administrative layer client 314a and a second policy change associated with the tenant Tb to the administrative layer client 314b. In some implementations, the same administrative layer client may be associated with multiple tenants. The administrative layer clients (314a and 314b) receive the policy changes but do not implement the policy changes until an authorization process is completed.

The authorization process includes the authorization client 318, based on the authorization request notification from the control plane service 310, sending an authorization request to the tenants (Ta and Tb). The authorization request may include a first authorization request associated with the first policy change and the tenant Ta and a second authorization request associated with the second policy change and the tenant Tb. The tenants (Ta and Tb) may send a reply to the authorization request indicating an allow or a deny command. The authorization request receives the replies and directs the replies to the respective administrative layer clients (314a and 314b). For example, the reply from the tenant Ta is directed to the administrative layer client 314a and the reply from the tenant Tb is directed to the administrative layer client 314*b*. The administrative layer clients 314*a* complete the implementation process depending on the whether an allow message or a deny message is received. If a deny message is received, the administrative layer clients (314*a* and 314*b*) do not implement the policy change. If an allow message is received, the administrative layer clients (314*a* and 314*b*) implement the corresponding policy change.

While the embodiment of FIG. 3 includes two tenants and one policy change, environments and workflows with any number of tenants and/or any number of policy changes are possible as the systems and methods described herein are configured to scale to handle any number of tenants and associated policies.

Figure 4:
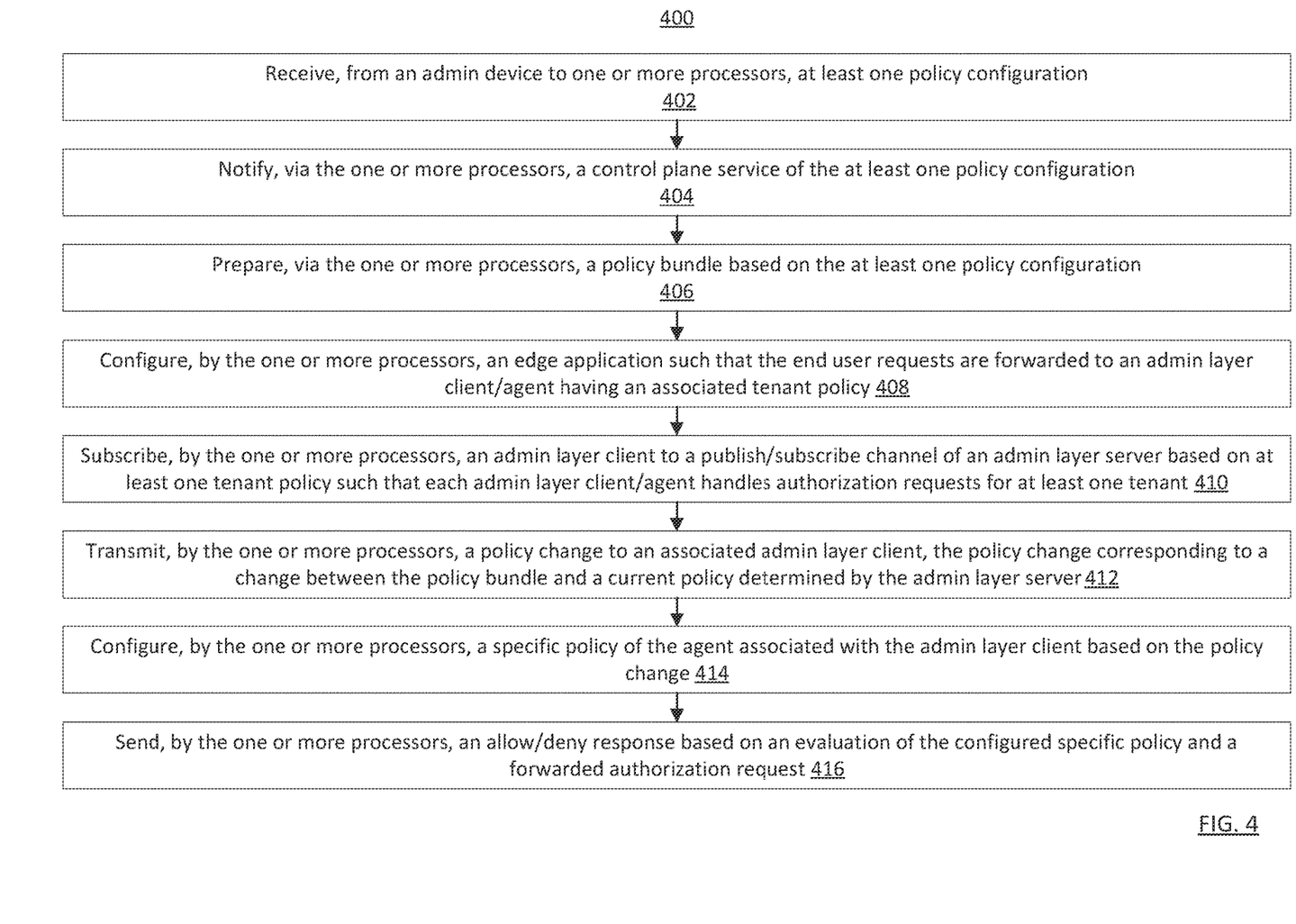
FIG. 4 shows a flowchart for a method for implementing policy bundles in a multi-tenant environment, according to an embodiment.

FIG. 4 is a method 400 for implementing a policy bundle in a multi-tenant environment. Method 400 includes receiving, from an admin device and at one or more processors, at least one policy configuration, at 402; notifying, via the one or more processors, a control plane service of the at least one policy configuration, at 404; preparing, via the one or more processors, a policy bundle based on the at least one policy configuration, at 406; configuring, by the one or more processors, an edge application such that the end user requests are forwarded to an administrative layer client/agent having an associated tenant policy, at 408; subscribing, by the one or more processors, an administrative layer client to a publish/subscribe channel of an administrative layer server based on at least one tenant policy such that each administrative layer client/agent handles authorization requests for at least one tenant, at 410; transmitting, by the one or more processors, a policy change to an associated administrative layer client, the policy change corresponding to a change between the policy bundle and a current policy determined by the administrative layer server, at 412; configuring, by the one or more processors, a specific policy of the agent associated with the administrative layer client based on the policy change, at 414; and sending, by the one or more processors, an allow/deny response based on an evaluation of the configured specific policy and a forwarded authorization request, at 416.

At 402, one or more processors (e.g., functionally and/or structurally similar to the processor 102 of FIG. 1) receive at least one policy configuration from an admin device (e.g., functionally and/or structurally similar to the user compute device 130 of FIG. 1). The at least one policy configuration may be provided to and/or inputted into the admin device by a user. The policy configuration may be associated with any number of tenants in a multi-tenant environment. The at least one policy configuration may include the same policy configuration for a number of tenants or may include distinct policy configurations for a number of tenants.

At 404, the one or more processors then notify a control plane service (e.g., structurally and/or functionally similar to the control plane service 110 of FIG. 1) of the at least one policy configuration. The notification may include various information regarding the at least policy configuration such as the associated tenants, configuration preferences, etc. The notification may also include an estimated load value for implementing the at least one policy configuration.

At 406, the one or more processors prepare a policy bundle based on the at least one policy configuration. Preparing the policy bundle based on the at least one policy configuration may include generating a policy bundle that includes the differences between the at least one policy configuration and the present policies of the tenants and not the entire policy. In some embodiments, the policy bundle includes the at least one policy configuration as well as routing information such as publisher/subscriber channels and/or the like.

At 408, the one or more processors configure an edge application such that the end user requests are forwarded to an administrative layer client/agent (e.g., functionally and/or structurally similar to the administrative layer client 114 and the agent 116 of FIG. 1) having an associated tenant policy. In some implementations, the edge application is the control plane service. In some implementations, configuring the edge application may include creating and/or defining a publisher/subscriber channel between the edge application, the administrative layer client/agent and an authorization client (e.g., structurally and/or functionally similar to the authorization client 118 of FIG. 1) to allow for end users to provide authorization information for implementing the policy bundle.

At 410, the one or more processors subscribe the administrative layer client to a publish/subscribe channel of an administrative layer server (e.g., functionally and/or structurally similar to the administrative layer server 112 of FIG. 1) based on at least one tenant policy such that each administrative layer client/agent handles authorization requests for at least one tenant. In some implementations, the publish/subscribe channels may already be subscribed to.

At 412, the one or more processors transmit a policy change to an associated administrative layer client. The policy change corresponds to a change between the policy bundle and a current policy. In some implementations, an authorization message is also transmitted to the associated administrative layer client. The authorization message may be an allow or deny message from an associated tenant indicating whether the policy change may or may not be implemented.

At 414, the one or more processors configure a specific policy of the agent associated with the administrative layer client based on the policy change. Configuring the specific policy includes implementing the policy change into the specific policy. This may include additions, substitutions, or deletions of parts or all of the specific policy. In some implementations, the configured specific policy may not be executed until an allow/deny response is received. The one or more processors, at 416, send an allow/deny response. The allow/deny response is associated with an evaluation of the configured specific policy and a forwarded authorization request.

Figure 5:
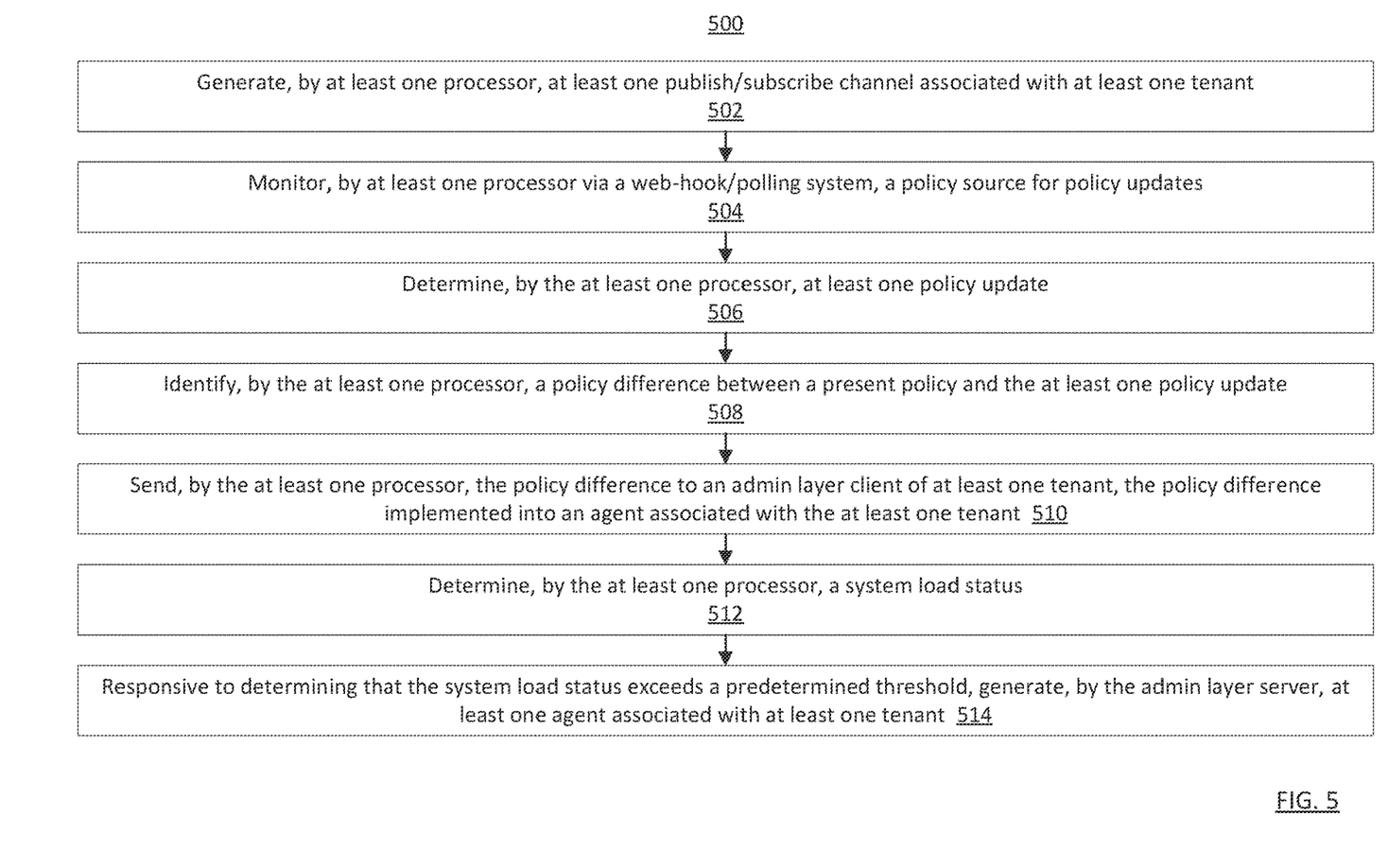
FIG. 5 shows a flowchart for a method for generating agents in a multi-tenant environment, according to an embodiment.

FIG. 5 shows a flowchart for a method 500 for generating agents in a multi-tenant environment, according to an embodiment. Method 500 includes generating, by at least one processor, at least one publish/subscribe channel associated with at least one tenant, at 502; monitoring, by at least one processor via a web-hook/polling system, a policy source for policy updates, at 504; determining, by the at least one processor, at least one policy update, at 506; identifying, by the at least one processor, a policy difference between a present policy and the at least one policy update, at 508; sending, by the at least one processor, the policy difference to an administrative layer client of at least one tenant, the policy difference implemented into an agent associated with the at least one tenant, at 510; determining, by the at least one processor, a system load status, at 512; and responsive to determining that the system load status exceeds a predetermined threshold, generating, by the administrative layer server, at least one agent associated with at least one tenant, at 514.

At 502, the at least one processor generates at least one publish/subscribe channel associated with at least one tenant. The publish/subscribe channel may be formed between an administrative layer client (e.g., structurally and/or functionally similar to the administrative layer client 114 of FIG. 1) and an administrative layer server (e.g., structurally and/or functionally similar to the administrative layer server 112 of FIG. 1) and/or between the administrative layer client and the at least one tenant.

At 504, the at least one processor, via a web-hook/polling system, monitors a policy source for policy updates. The policy source may be a user device (e.g., user compute device 130 of FIG. 1) or another input source configured to receive policy updates. For example, the policy source may be an administrator (e.g., admin A of FIG. 2) operating a user device. The policy updates may be rolling (e.g., inputted continuously) or may be inputted as a policy update bundle. The web-hook/polling system monitors the policy source so that a notification may be generated indicating a policy update is present. In some implementations, the web-hook/polling system only issues a notification when a policy update is received and reduces messages indicating a lack of updates.

At 506, the at least one processor determines at least one policy update. The web-hook/polling system issues a notification that the at least one policy update is present. The notification may command the processor to fetch the at least one policy update.

At 508, the at least one processor identifies a policy difference between a present policy and the at least one policy update. The processor receives the at least one policy update after fetching in response to receiving the notification indicating a policy update is present. The processor may receive or fetch the present policy from a database, repository, or the like (e.g., the database 140 of FIG. 1). The policy difference is determined by comparing the present policy with the at least one policy update. The policy difference corresponds to what changes may be implemented into the present policy.

At 510, the at least one processor sends the policy difference to an administrative layer client of at least one tenant, the policy difference implemented into an agent associated with the at least one tenant. In some implementations, the at least one processor may send an authorization message to the administrative layer client indicating whether the administrative layer client should allow or deny the policy difference should be implement into the agent.

At 512, the at least one processor determines a system load status. The system load status is the status of the load experienced by at least the administrative layer clients. The system load status may correspond to a sum of the loads of the administrative layer clients. In some implementations, the system load status may indicate whether the system is at, above, or below as predetermined threshold. The predetermined threshold may correspond to the capacity of the administrative layer clients.

At 514, responsive to determining the system load status exceeds a predetermined threshold, the administrative layer server generates at least one agent associated with at least one tenant. In some implementations, the at least one agent is generated by a control plane service (e.g., structurally and/or functionally similar to the control plane service 110 of FIG. 1). The at least one agent generated by the control plane service can take on additional load associated with policy changes. 512-514 may be repeated if the system load status does not fall below the predetermined threshold. Generating new agents allows for new tenants to be managed by expanding systems instead of overloading.

In some implementations, 514 may include rebalancing the load on the administrative layer clients. If the load status exceeds a predetermined threshold for at least one of the administrative layer clients but is below the predetermined threshold for at least one other administrative layer client, the load on the administrative layer clients may be rebalanced. For example, the control plane service and/or the administrative layer server may form a new publish/subscribe channel so that processes that were being processed by the at least one administrative layer clients, with a load status above the predetermined threshold, may be routed to the at least one other administrative layer client with a load status below the predetermined threshold.

Figure 6:
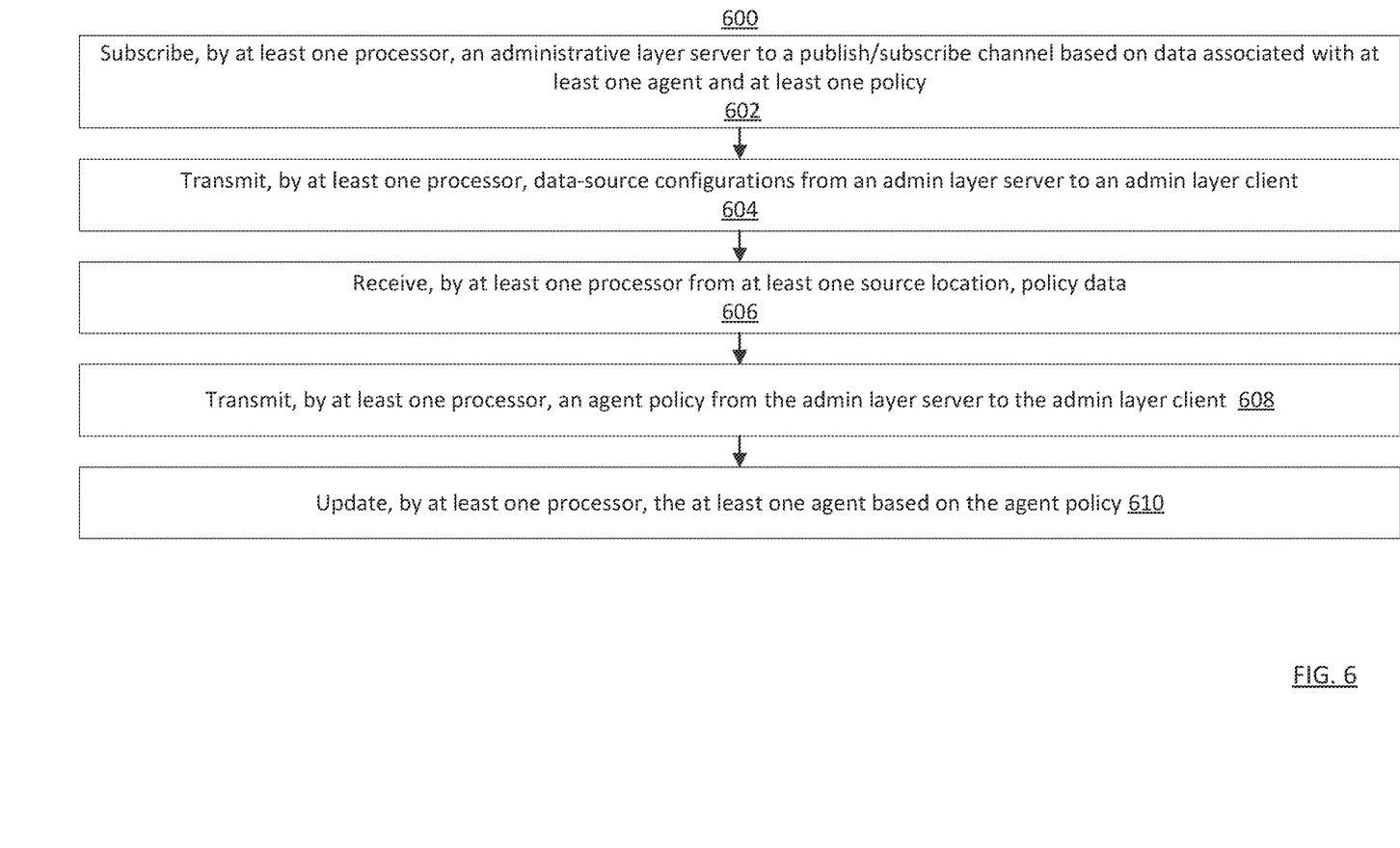
FIG. 6 shows a flowchart for a method of updating an agent, according to an embodiment.

FIG. 6 shows a flowchart for a method 600 of updating an agent, according to an embodiment. The method 600 includes subscribing, by at least one processor, an administrative layer server to a publish/subscribe channel based on data associated with at least one agent and at least one policy, at 602; transmitting, by the at least one processor, data-source configurations from an administrative layer server to an administrative layer client, at 604; receiving, by the at least one processor from at least one source location, policy data, at 606; transmitting, by the at least one processor, an agent policy from the administrative layer server to the administrative layer client, at 608; and updating, by the at least one processor, the at least one agent based on the agent policy, at 610.

At 602, the at least one processor subscribes an administrative layer server to a publish/subscribe channel based on data associated with at least one agent and at least one policy. The publish/subscribe channel is a channel between an administrative layer client (e.g., structurally and/or functionally similar to the administrative layer client 114 of FIG. 1) associated with the at least one agent and an administrative layer server (e.g., structurally and/or functionally similar to the administrative layer server 112 of FIG. 1). The publish/subscribe channel allows for information to flow between the administrative layer client and the administrative layer server and form an association therebetween. The publish/subscribe channel can be the channel which can direct the at least one policy to the associated at least one agent. In some implementations, the at least one processor may subscribe the administrative layer server to more than one publish/subscribe channel. For example, if the at least one policy includes the policies of tenants associated with more than one agent, then the at least one processor may subscribe the administrative layer server to more than one administrative layer client associated with the more than one agent.

At 604, the at least one processor transmits data-source configurations from an administrative layer server to an administrative layer client. The data-source configurations can include the at least one policy. At 606, the at least one processor receives, from at least one source location, policy data. The policy data may include a present policy associated with the at least one agent. In some implementations, the at least one processor may generate a policy change based on the present policy and the at least one policy. The policy change indicates the difference between the present policy and the at least one policy.

At 608, the at least one processor transmits an agent policy from the administrative layer server to the administrative layer client. The agent policy may be associated with the policy change or with the at least one policy. For example, the agent policy may include policies from the at least one policy that are relevant to the associated agent. In some implementations, the agent policy may include policies associated with more than one agent. At 610, the at least one processor updates the at least one agent based on the agent policy. Updating the at least one agent based on the agent policy may include replacing, updating, revising, adding, or removing portions of the present policy of the agent.

FIG. 7 shows an example of a policy bundle 700, according to an embodiment. The policy bundle 700 includes policy configurations for three tenants. The policy bundle 700 is arranged in a branched data structure where tenants IDs (702a, 702b, and 702c) form branches with associated policy data (704a, 704b, 704c) as subtrees. The branched structure allows for tenant policies to be maintained more efficiently. In some implementations, for example, if the policy of a particular tenant is updated, then only the corresponding tenant's policy fragment (e.g., directory) will be pushed to the tenant's subscribers.

Each tenant is identified with the tenant ID (702a, 702b, and 702c). The tenant IDs (702a, 702b, and 702c) allow for policies within the policy bundle to be implemented in the desired tenant's policy. In some embodiments, the publish/subscribe channels are formed based on the tenant IDs (702a, 702b, and 702c). For example, the tenant IDs (702a, 702b, and 702c) may indicate which channel associated with an administrative layer client the administrative layer server should subscribe to and receive notification for. The tenant IDs (702a, 702b, and 702c) allow for the tenants to be identified based on a tenant ID directory (e.g., stored in a database).

Each tenant ID (702a, 702b, and 702c) includes associated policy data (704a, 704b, and 704c). The policy data (704a, 704b, and 704c) is data indicating what kind of policy is desired for the respective tenant. In some implementations, various tenants may include the same policy data or may include distinct policy data.

In some embodiments, an apparatus includes one or more memories and one or more processors operatively coupled to the one or more memories. The one or more processors configured to receive a policy bundle associated with at least one tenant from a plurality of tenants, determine a policy change associated with a change between the policy bundle and a tenant policy of the at least one tenant. The policy change can be associated with a load value. The one or more processors are configured to subscribe an administration client to an associated channel of an administration layer server based on the tenant policy, transmit the policy change to the administration layer client, implement the policy change into an agent associated with the administration layer client, determine a system load status based on a plurality of administration layer clients and the load value, and responsive to determining that the system load status exceeds a predetermine threshold, generate at least one agent associated with the at least one tenant.

In some implementations, the associated channel is a configurable backbone publish/subscribe channel.

In some implementations, the one or more processors are further configured to, responsive to receiving the policy bundle, send a notification to a control plane service.

In some implementations, the control plane service is configured to configure an edge application such that an end user request is forwarded to an associated administration layer client.

In some implementations, the one or more processors are further configured to forward, via the edge application from the at least one tenant, an authorization request to an associated administration layer client.

In some implementations, the at least one policy bundle is received via a queue service/notification service.

In some implementations, the one or more processors are further configured to store the policy bundle in a database.

In some implementations, the one or more processors are further configured to monitor, via a web-hook/polling system, a policy source for policy updates.

In some embodiments, a non-transitory processor-readable medium stores code representing instructions to be executed by one or more processors. The instructions include code to cause the one or more processors to receive at least one policy bundle associated with at least one tenant from a plurality of tenants, determine a policy change associated with a change between the at least one policy bundle and a tenant policy of the at least one tenant. The policy change is associated with a load value. The instructions further include code to cause the one or more processors to transmit, based on an administration client being subscribed to an associated channel of an administration layer server, the policy change to the administration layer client, implement the policy change into an agent associated with the administration layer client, determine a system load status based on a plurality of administration layer clients and the load value, and responsive to determining that the system load status exceeds a predetermine threshold, generate at least one agent associated with the at least one tenant.

In some implementations, the associated channel is a configurable backbone publish/subscribe channel.

In some implementations, the code further includes code to cause the one or more processors to, responsive to receiving the policy bundle, send a notification to a control plane service.

In some implementations, the control plane service is configured to configure an edge application such that an end user request is forwarded to an associated administration layer client.

In some implementations, the code further includes code to cause the one or more processors to forward, via an edge application, an authorization request to an associated administration layer client.

In some implementations, the at least one policy bundle is received via a queue service/notification service.

In some implementations, the code further includes code to cause the one or more processors to store the policy bundle in a database.

In some embodiments, a method includes receiving, by one or more processors, at least one policy bundle associated with at least one tenant from a plurality of tenants, determining, by the one or more processors, a policy change associated with a change between the policy bundle and a tenant policy of the at least one tenant. The policy change is associated with a load value. The method further includes sending, by the one or more processors, the policy change to an administration layer server. The administration layer server is configured to communicate with an administration layer client associated with the policy change. The method further includes sending, by the one or more processors, a configuration signal to an authorization client configured to receive an authorization request associated with the policy change, determining, by the one or more processors, a system load status based on a plurality of administration layer clients and the load value, and, responsive to determining the system load status exceeds a predetermined threshold, sending, by the one or more processors to the administration layer server, a signal to the administration layer server, the signal including instructions to generate at least one agent associated with the at least one tenant.

In some implementations, the signal further includes instructions to generate at least one administration layer client associated with the at least one tenet.

In some implementations, the method further includes receiving, by the one or more processors, a notification associated with the at least one policy bundle.

In some implementations, the method further includes configuring, by the one or more processors, an edge application such that an end user request is forwarded to an associated administration layer client.

In some implementations, the authorization request is associated with the administration layer client.

It should be understood that the disclosed embodiments are not intended to be exhaustive, and functional, logical, operational, organizational, structural and/or topological modifications may be made without departing from the scope of the disclosure. As such, all examples and/or embodiments are deemed to be non-limiting throughout this disclosure.

All definitions, as defined and used herein, should be understood to control over dictionary definitions, definitions in documents incorporated by reference, and/or ordinary meanings of the defined terms.

Examples of computer code include, but are not limited to, micro-code or micro-instructions, machine instructions, such as produced by a compiler, code used to produce a web service, and files containing higher-level instructions that are executed by a computer using an interpreter. For example, embodiments can be implemented using Python, Java, JavaScript, C++, and/or other programming languages and development tools. Additional examples of computer code include, but are not limited to, control signals, encrypted code, and compressed code.

The drawings primarily are for illustrative purposes and are not intended to limit the scope of the subject matter described herein. The drawings are not necessarily to scale; in some instances, various aspects of the subject matter disclosed herein can be shown exaggerated or enlarged in the drawings to facilitate an understanding of different features. In the drawings, like reference characters generally refer to like features (e.g., functionally similar and/or structurally similar elements).

The acts performed as part of a disclosed method(s) can be ordered in any suitable way. Accordingly, embodiments can be constructed in which processes or steps are executed in an order different than illustrated, which can include performing some steps or processes simultaneously, even though shown as sequential acts in illustrative embodiments. Put differently, it is to be understood that such features may not necessarily be limited to a particular order of execution, but rather, any number of threads, processes, services, servers, and/or the like that may execute serially, asynchronously, concurrently, in parallel, simultaneously, synchronously, and/or the like in a manner consistent with the disclosure. As such, some of these features may be mutually contradictory, in that they cannot be simultaneously present in a single embodiment. Similarly, some features are applicable to one aspect of the innovations, and inapplicable to others.

Where a range of values is provided, it is understood that each intervening value, to the tenth of the unit of the lower limit unless the context clearly dictates otherwise, between the upper and lower limit of that range and any other stated or intervening value in that stated range is encompassed within the disclosure. That the upper and lower limits of these smaller ranges can independently be included in the smaller ranges is also encompassed within the disclosure, subject to any specifically excluded limit in the stated range. Where the stated range includes one or both of the limits, ranges excluding either or both of those included limits are also included in the disclosure.

The phrase "and/or," as used herein in the specification and in the embodiments, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements can optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the embodiments, "of" should be understood to have the same meaning as "and/or" as defined above. For example, when separating items in a list, "or" or "and/or" shall be interpreted as being inclusive, i.e., the inclusion of at least one, but also including more than one of a number or list of elements, and, optionally, additional unlisted items. Only terms clearly indicated to the contrary, such as "only one of" or "exactly one of," or, when used in the embodiments, "consisting of," will refer to the inclusion of exactly one element of a number or list of elements. In general, the term "or" as used herein shall only be interpreted as indicating exclusive alternatives (i.e., "one or the other but not both") when preceded by terms of exclusivity, such as "either," "one of," "only one of," or "exactly one of" "Consisting essentially of," when used in the embodiments, shall have its ordinary meaning as used in the field of patent law.

As used herein in the specification and in the embodiments, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements can optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the embodiments, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

Some embodiments described herein relate to a computer storage product with a non-transitory computer-readable medium (also can be referred to as a non-transitory processor-readable medium) having instructions or computer code thereon for performing various computer-implemented operations. The computer-readable medium (or processor-readable medium) is non-transitory in the sense that it does not include transitory propagating signals per se (e.g., a propagating electromagnetic wave carrying information on a transmission medium such as space or a cable). The media and computer code (also can be referred to as code) can be those designed and constructed for the specific purpose or purposes. Examples of non-transitory computer-readable media include, but are not limited to, magnetic storage media such as hard disks, floppy disks, and magnetic tape; optical storage media such as Compact Disc/Digital Video Discs (CD/DVDs), Compact Disc-Read Only Memories (CD-ROMs), and holographic devices; magneto-optical storage media such as optical disks; carrier wave signal processing modules; and hardware devices that are specially configured to store and execute program code, such as Application-Specific Integrated Circuits (ASICs), Programmable Logic Devices (PLDs), Read-Only Memory (ROM) and Random-Access Memory (RAM) devices. Other embodiments described herein relate to a computer program product, which can include, for example, the instructions and/or computer code discussed herein.

Some embodiments and/or methods described herein can be performed by software (executed on hardware), hardware, or a combination thereof. Hardware modules may include, for example, a processor, a field programmable gate array (FPGA), and/or an application specific integrated circuit (ASIC). Software modules (executed on hardware) can include instructions stored in a memory that is operably coupled to a processor and can be expressed in a variety of software languages (e.g., computer code), including C, C++, Java™, Ruby, Visual Basic™, and/or other object-oriented, procedural, or other programming language and development tools. Examples of computer code include, but are not limited to, micro-code or micro-instructions, machine instructions, such as produced by a compiler, code used to produce a web service, and files containing higher-level instructions that are executed by a computer using an interpreter. For example, embodiments may be implemented using imperative programming languages (e.g., C, Fortran, etc.), functional programming languages (Haskell, Erlang, etc.), logical programming languages (e.g., Prolog), object-oriented programming languages (e.g., Java, C++, etc.) or other suitable programming languages and/or development tools. Additional examples of computer code include, but are not limited to, control signals, encrypted code, and compressed code.

What is claimed is:

1. An apparatus, comprising:
one or more memories; and
one or more processors operatively coupled to the one or more memories, the one or more processors configured to:
receive a policy bundle associated with at least one tenant from a plurality of tenants;
determine a policy change associated with a change between the policy bundle and a tenant policy of the at least one tenant, the policy change associated with a load value;
subscribe an administration layer client to an associated channel of an administration layer server based on the tenant policy;
transmit the policy change to the administration layer client;
implement the policy change into an agent associated with the administration layer client;
determine a system load status based on a plurality of administration layer clients and the load value; and
responsive to determining the system load status exceeds a predetermined threshold, generate at least one agent associated with the at least one tenant.

2. The apparatus of claim 1, wherein the associated channel is a configurable backbone publish/subscribe channel.

3. The apparatus of claim 1, wherein the one or more processors are further configured to:
responsive to receiving the policy bundle, send a notification to a control plane service.

4. The apparatus of claim 3, wherein the control plane service is configured to configure an edge application such that an end user request is forwarded to an associated administration layer client.

5. The apparatus of claim 4, wherein the one or more processors are further configured to:
forward, via the edge application from the at least one tenant, an authorization request to an associated administration layer client.

6. The apparatus of claim 1, wherein the policy bundle is received via a queue service/notification service.

7. The apparatus of claim 1, wherein the one or more processors are further configured to:
store the policy bundle in a database.

8. The apparatus of claim 1, wherein the one or more processors are further configured to:
monitor, via a web-hook/polling system, a policy source for policy updates.

9. A non-transitory processor-readable medium storing code representing instructions to be executed by one or more processors, the instructions comprising code to cause the one or more processors to:
receive at least one policy bundle associated with at least one tenant from a plurality of tenants;
determine a policy change associated with a change between the at least one policy bundle and a tenant policy of the at least one tenant, the policy change associated with a load value;
transmit, based on an administration layer client being subscribed to an associated channel of an administration layer server, the policy change to the administration layer client;
implement the policy change into an agent associated with the administration layer client;
determine a system load status based on a plurality of administration layer clients and the load value; and
responsive to determining the system load status exceeds a predetermined threshold, generate at least one agent associated with the at least one tenant.

10. The non-transitory processor-readable medium of claim 9, wherein the associated channel is a configurable backbone publish/subscribe channel.

11. The non-transitory processor-readable medium of claim 9, wherein the code further comprises code to cause the one or more processors to:

responsive to receiving the at least one policy bundle, send a notification to a control plane service.

12. The non-transitory processor-readable medium of claim 11, wherein the control plane service is configured to configure an edge application such that an end user request is forwarded to an associated administration layer client.

13. The non-transitory processor-readable medium of claim 12, wherein the code further comprises code to cause the one or more processors to:

forward, via an edge application, an authorization request to an associated administration layer client.

14. The non-transitory processor-readable medium of claim 9, wherein the at least one policy bundle is received via a queue service/notification service.

15. The non-transitory processor-readable medium of claim 9, wherein the code further comprises code to cause the one or more processors to:

store the at least one policy bundle in a database.

16. A method comprising:

receiving, by one or more processors, at least one policy bundle associated with at least one tenant from a plurality of tenants;

determining, by the one or more processors, a policy change associated with a change between the at least one policy bundle and a tenant policy of the at least one tenant, the policy change associated with a load value;

sending, by the one or more processors, the policy change to an administration layer server, the administration layer server configured to communicate with an administration layer client associated with the policy change;

sending, by the one or more processors, a configuration signal to an authorization client, the authorization client configured to receive an authorization request associated with the policy change;

determining, by the one or more processors, a system load status based on a plurality of administration layer clients and the load value; and responsive to determining the system load status exceeds a predetermined threshold, sending, by the one or more processors to the administration layer server, a signal to the administration layer server, the signal including instructions to generate at least one agent associated with the at least one tenant.

17. The method of claim 16, wherein the signal further includes instructions to generate at least one administration layer client associated with the at least one tenant.

18. The method of claim 16, further comprising:

receiving, by the one or more processors, a notification associated with the at least one policy bundle.

19. The method of claim 18, further comprising:

configuring, by the one or more processors, an edge application such that an end user request is forwarded to an associated administration layer client.

20. The method of claim 19, wherein the authorization request is associated with the administration layer client.

* * * * *